United States Patent [19]

Cooper

[11] Patent Number: 4,795,652

[45] Date of Patent: Jan. 3, 1989

[54] METHOD FOR FORMING AN EDIBLE FOOD CONTAINER

[75] Inventor: Ian A. Cooper, Cherry Hill, N.J.

[73] Assignee: Cooper Concepts, Inc., Philadelphia, Pa.

[21] Appl. No.: 941,448

[22] Filed: Dec. 15, 1986

[51] Int. Cl.$^4$ ............................................. A21D 8/02

[52] U.S. Cl. ................................. 426/549; 426/138; 426/501; 426/514

[58] Field of Search ................ 426/138, 139, 94, 499, 426/19, 27, 143, 295, 439, 549, 500, 501, 505, 502, 514, 517, 516, 519, 512, 504, 551, 21, 447, 282

[56] References Cited

U.S. PATENT DOCUMENTS

| | | | |
|---|---|---|---|
| 533,553 | 2/1895 | Perky | 425/296 |
| 754,549 | 3/1904 | Dietz | 425/391 |
| 913,597 | 2/1909 | Westling | 99/357 |
| 943,293 | 12/1909 | Andalaft | 425/391 |
| 1,015,400 | 1/1912 | Renaud | 426/139 |
| 1,350,859 | 8/1920 | Drouillard | 99/354 |
| 1,481,813 | 1/1924 | Taylor | 425/360 |
| 1,587,222 | 6/1926 | Edwards | 493/296 |
| 1,634,492 | 5/1927 | Dunlap | 493/291 |
| 1,652,375 | 12/1927 | Sabbag | 425/391 |
| 1,800,852 | 4/1931 | Winzer | 425/90 |
| 1,896,135 | 2/1933 | Dunlap | 493/296 |
| 1,915,210 | 6/1933 | Balton | 426/139 |
| 2,029,448 | 2/1936 | Tatosian | 99/380 |
| 2,045,730 | 6/1936 | Schepman et al. | 426/139 |
| 2,200,956 | 5/1940 | Kennedy | 426/139 |
| 2,213,727 | 9/1940 | Yohai et al. | 99/383 |
| 2,279,289 | 4/1942 | Page | 493/296 |
| 2,321,634 | 6/1943 | Tatosian | 99/353 |
| 2,508,724 | 5/1950 | Moffett, Jr. | 426/138 |
| 2,627,237 | 2/1953 | Angell | 425/391 |
| 2,628,576 | 2/1953 | Finke | 425/319 |
| 2,669,196 | 2/1954 | Heyman | 425/391 |
| 2,704,041 | 3/1955 | Christman | 99/427 |
| 2,756,696 | 7/1956 | Wise | 99/383 |
| 2,774,315 | 12/1956 | Heyman | 99/373 |
| 2,888,710 | 6/1959 | Mueller et al. | 425/391 |
| 3,086,484 | 4/1963 | Ibex | 425/391 |
| 3,139,843 | 7/1964 | Ibex | 425/391 |
| 3,157,096 | 11/1964 | Schmidt | 493/296 |
| 3,157,134 | 11/1964 | Heyman | 99/361 |
| 3,225,710 | 12/1965 | Schafer | 425/391 |
| 3,269,335 | 8/1966 | Heyman | 118/219 |
| 3,338,142 | 8/1967 | Simpson et al. | 425/391 |
| 3,402,646 | 9/1968 | Hall | 493/296 |
| 3,410,691 | 11/1968 | Stanley | 426/138 |
| 3,431,869 | 3/1969 | Frank | 426/514 |
| 3,463,060 | 9/1969 | Chebuhar | 493/296 |
| 3,500,767 | 3/1970 | Hodge | 425/162 |
| 3,505,933 | 4/1970 | Schmidt | 493/296 |
| 3,585,943 | 6/1971 | Tangay et al. | 425/391 |
| 3,605,573 | 9/1971 | Buhle | 493/296 |
| 3,669,007 | 6/1972 | Pulici | 426/94 |
| 3,792,954 | 2/1974 | Heyman | 425/391 |
| 3,793,938 | 2/1974 | Haas | 426/283 |
| 3,861,291 | 1/1975 | Guzaski | 425/391 |
| 3,867,559 | 2/1975 | Haas | 426/283 |
| 4,002,714 | 1/1977 | Usui | 264/250 |
| 4,035,461 | 7/1977 | Korth | 264/534 |
| 4,150,935 | 4/1979 | Venzo | 425/321 |
| 4,170,172 | 10/1979 | Wommelsdorf | 493/296 |
| 4,276,317 | 6/1981 | Hayashi | 426/517 |
| 4,303,690 | 12/1981 | Haas, Sr. et al. | 426/514 |
| 4,398,904 | 8/1983 | Fagerberg | 493/296 |
| 4,525,154 | 6/1985 | Sauget | 493/154 |
| 4,526,566 | 7/1985 | Briand | 493/296 |
| 4,624,855 | 11/1986 | Haas et al. | 426/138 |

*Primary Examiner*—George Yeung
*Attorney, Agent, or Firm*—Panitch Schwarze Jacobs & Nadel

[57] ABSTRACT

A method of forming an edible food container from viscous dough comprises the steps of mixing the dough, forming the dough into a generally continuous sheet, and cutting the sheet of dough into generally parallelogram shaped pieces of a predetermined length and width. Each of the dough pieces is wrapped around a shaping surface of a shaping mandrel so that the first and second ends of each dough piece engage each other to form a generally continuous covering of dough around the shaping mandrel. Excess dough extending beyond the ends of the shaping surface of the mandrel are trimmed away and the dough on the mandrel is showered with a caustic soda. The dough is then baked and cooled on the mandrel. After cooling, the baked dough is twisted with respect to the mandrel to remove the edible food container from the mandrel. In the preferred embodiment, the shaping mandrel is cone shaped for forming a cone shaped edible food container.

9 Claims, 5 Drawing Sheets

METHOD FOR FORMING AN EDIBLE FOOD CONTAINER

BACKGROUND OF THE INVENTION

The present invention relates to a method and apparatus for forming an edible food container from highly viscous dough, and, more particularly, to forming such a container which is generally cone shaped.

Highly viscous dough, like pretzel dough, is distinctly different from dough commonly used in forming edible food containers such as ice cream cones. The thick texture of pretzel dough with its highly viscous nature precludes the application of known prior art methods for cone formation. For example, pretzel dough, because of its high viscosity, cannot be poured as other doughs can into a mold or cavity for baking. Therefore, in the baking and pretzel industry, there has been limited usage of highly viscous doughs in the formation of edible food containers.

The previous technology for forming an edible food container from pretzel dough involves extruding dough onto a male mold section. The dough covered male mold section is then compressed with a complementary female mold section to form the container into the cone shape. The container is perforated, dried, sprayed with a hot caustic solution and baked until edible. This prior art method has proven to lack cost effectiveness and to be inefficient. In addition, the prior art method fails to consistently produce acceptable quality products. Furthermore, removal of the baked cone from the mold often results in an unacceptably high percentage of cone breakage. These problems have contributed to a lack of commercial success of such pretzel dough edible food containers.

The present invention overcomes these and other drawbacks associated with forming an edible food container from pretzel dough using a mandrel having special features upon which the dough is baked. The present invention also comprises a commercially viable method of producing pretzel dough food containers utilizing the special mandrel. The method of the present invention provides for consistent production of high quality products in a simple and efficient manner.

SUMMARY OF THE INVENTION

Briefly stated, the present invention relates to a method and a mandrel for forming an edible food container from viscous dough. The method comprises the steps of mixing the dough, forming the dough into a continuous sheet, cutting the dough sheet into generally parallelogram shaped pieces, wrapping the dough pieces around a shaping mandrel, trimming the excess shaped dough which extends beyond a shaping surface of the mandrel, showering the dough on the shaping mandrel with caustic soda, baking the dough on the shaping mandrel, cooling the dough on the shaping mandrel, and twisting the baked dough with respect to the mandrel to remove the edible food container from the mandrel. The novel mandrel of the invention comprises a tapered cone shaped mandrel having a first smaller closed apex end and a second generally open end, the open end including an outwardly flanged edge for trimming excess dough. Furthermore, the mandrel comprises an engagement means proximate the open end for engaging a stop means to assist in removing the edible container from the mandrel.

BRIEF DESCRIPTION OF THE DRAWINGS

The foregoing Summary, as well as the following detailed description, will be better understood when read in conjunction with the appended drawings. For purposes of illustrating the invention, there is shown in the drawings an embodiment which is presently preferred, it being understood, however, that this invention is not limited to the precise arrangement or instrumentalities shown.

In the drawings.

DESCRIPTION OF A PREFERRED EMBODIMENT

Figure 1:
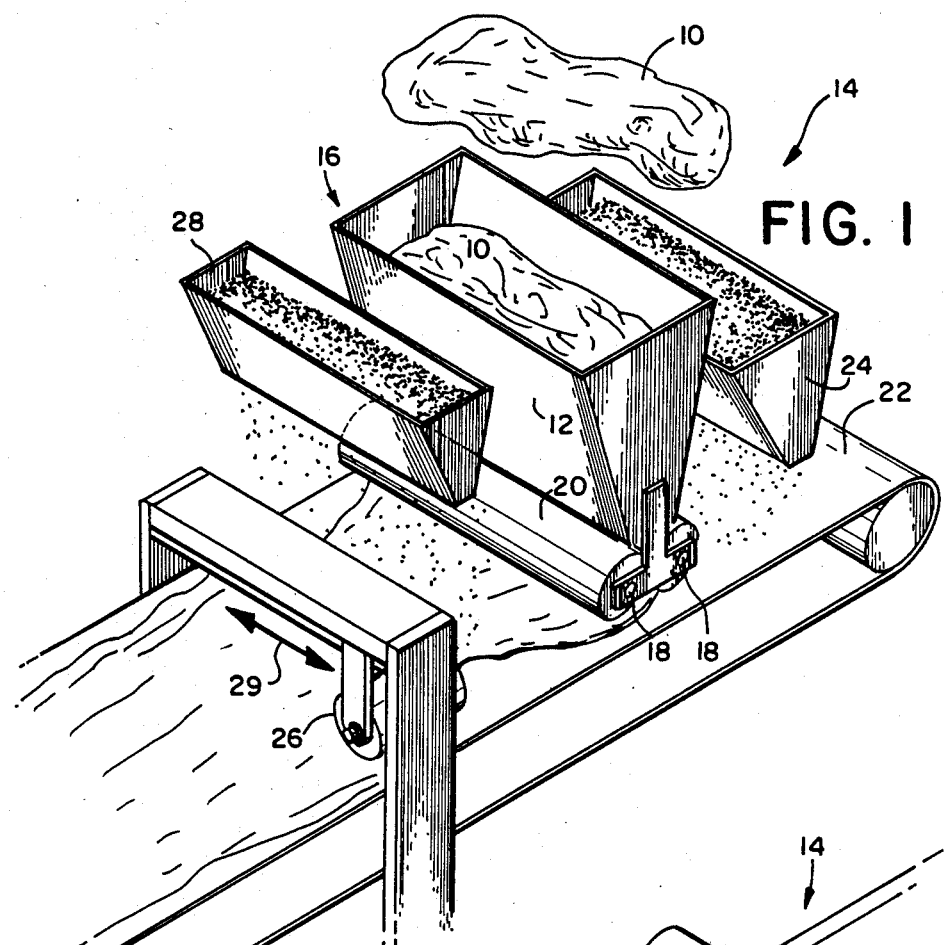
FIG. 1 is a perspective view of a sheeting machine in accordance with the present invention.

Referring to the drawings in detail wherein like numerals indicate like elements throughout, there is shown in FIGS. 1 through 9 apparatus utilized in accordance with the present invention.

The highly viscous dough used in accordance with the present invention is formed from standard ingredients well known in the art. In the preferred embodiment, the dough used is a pretzel dough. However, it will be apparent to those skilled in the art that dough having similar texture and composition could also be utilized in accordance with the present invention.

In forming the dough 10, the ingredients are first stirred or mixed in a mixer of conventional type well known in the art (not shown). The mixing process is completed when the ingredients are fully mixed and the dough 10 is formed into a viscous, pliable ball-like composition.

Figure 2:
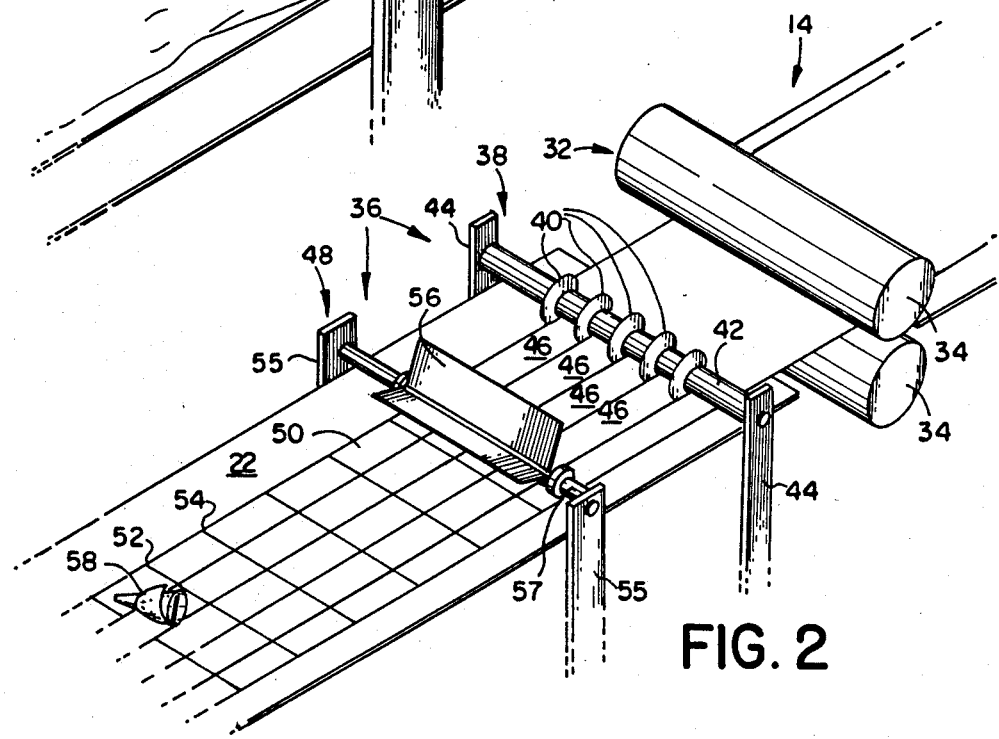
FIG. 2 is a perspective view of a cutting assembly in accordance with the present invention.

The mixed dough 10, as illustrated in FIG. 1, is placed in a dough dispensing hopper 12 which feeds the dough into a sheeting assembly shown generally as 14. In the preferred embodiment, the sheeting assembly 14 includes a first sheeting machine 16, a second sheeting machine 26, and a third sheeting machine 32 (FIG. 2). The first sheeting machine 16, shown schematically in FIG. 1, has a roller assembly 18 comprising three (only two shown) generally horizontally oriented rollers 20 driven at two variable speeds. The axial width of the rollers 20 in the presently preferred embodiment is about is 14 inches. The distance between the two rollers 20 is adjustable to vary the thickness of the flattened or sheeted dough emerging from between the rollers 20. In the preferred embodiment, the roller spacing and thus the dough thickness is adjustable from about one-eighth inch to about one inch.

It will be apparent to those skilled in the art that the first sheeting machine 16 may have other configurations for forming dough into a generally continuous sheet. An example of a commercially available first sheeting machine which can be utilized in accordance with the present invention, is a three-roll sheeting machine, type LUR, manufactured by Rykaart, Inc. In operation, the dough 10 is vertically dispensed from the hopper 12 into the roller assembly 18 of the first sheeting machine 16. Upon completion of the first or initial sheeting process, the dough 10 emerges from between rollers 20 and gradually descends onto a moving conveyor belt 22 of a conventional type well known in the art. In the preferred embodiment, the conveyor belt 22 has a total length of approximately six meters and a working width of approximately 24 inches. The conveyor belt 22 is driven by a variable speed drive (not shown). The conveyor belt 22 is initially coated with flour or some other suitable non-stick substance. In the present embodiment, a first flour duster 24, of a type well known in the art, coats the conveyor belt 22 with a thin coat of flour. The first flour duster 24 is located along the conveyor belt 22 at a position before the belt reaches the first sheeting machine 16. The flour coating prevents the dough 10 from sticking to the conveyor belt 22. The first flour duster 24 may be adjustable for dispensing varying quantities of flour onto the conveyor belt 22, depending on the composition and thickness of the dough.

The sheeted dough which emerges from the first sheeting machine 16 progresses onto the flour covered coveyor belt 22 and is moved by the conveyor belt 22 toward a second sheeting machine or cross roller assembly 26. Prior to reaching the cross roller assembly 26, a second flour duster 28, also of a type well known in the art, coats the upper surface of the sheeted dough with flour to prevent the dough from sticking to the rollers of the second sheeting machine 26. The second flour duster 28 is also adjustable for dispensing varying quantities of flour onto the sheeted dough, depending on the composition and thickness of the dough.

After being coated with flour the sheeted dough is moved by the conveyor belt 22 to the cross roller assembly 26. The cross roller assembly 26 then engages and further sheets the dough by moving back and forth from side to side as shown by the arrow 29 in FIG. 1 at a controlled speed in a direction transverse to the movement of the sheeted dough 10 on the conveyor belt 22. In the preferred embodiment, the cross roller assembly 26 sheets or flattens the dough into a continuous sheet having a predetermined uniform thickness and a transverse width adjustable between about 14 inches and about 24 inches. An example of a commercially available cross roller assembly 26 which can be utilized in accordance with the present invention is a cross-sheeter machine manufactured by Rykaarat, Inc. It will be apparent to those skilled in the art that other types of sheeting equipment can be used for sheeting the dough.

The cross-rolled dough progresses from the cross-roller assembly 26 on the conveyor belt 22 as shown schematically in FIG. 2, and is introduced into a third sheeting machine 32, also of a type well known in the art and commercially available from Rykaart, Inc. The third sheeting machine 32 further rolls the dough and forms the dough into a continuous sheet generally having a predetermined thickness and width. In the preferred embodiment, the third sheeting machine 32 includes two 8 inch rollers 34 driven by a variable speed drive (not shown) to sheet the dough lengthwise. The third sheeting machine 32 is adjustable for forming a continuous sheet of dough which varies in thickness from about 1/32 inch to about one inch.

The generally continuous sheet of dough formed by the third sheeting machine 32 progresses on the conveyor belt 22 toward a cutting assembly 36 of a type well known in the art and commercially available from Rykaart, Inc. The cutting assembly 36 includes a circular cutter 38 and a circular cleaver 48. In the preferred embodiment, the circular cutter 38 comprises a plurality of individual generally circular cutters 40 which are connected to a freely rotating rod 42 supported on each end by support members 44. The circumferentially outer edges or surfaces of the cutters 40 rest on, and are rotated by, the movement of the conveyor belt 22. The cutters 40 cut the continuous sheet of dough lengthwise into generally uniform parallel strips 46, each having a predetermined width, depending on the distance between the cutters 40 and the size of the edible food container to be formed. In the preferred embodiment, five cutters 40 are employed and the dough sheet is cut into four generally parallel shaped strips which are five inches in width.

The parallel strips 46 of dough are introduced into the circular cleaver 48. In the preferred embodiment, the circular cleaver 48 comprises a paddle wheel arrangement of three spaced blades 56 which are secured to a cylindrical paddle wheel axis member 57 rotatably supported by a pair of support members 55. The edges of the blades 56 rest on conveyor belt 22 so that the movement of the conveyor belt 22 causes the blades 56 and the cylindrical member 57 to rotate. The blades 56 cut the dough strips 46 transverse to the direction of movement of the conveyor belt 22 into generally parallelogram shaped pieces 50. In the drawings, pieces of dough 10 shown as generally rectangular in shape could be square, depending on the shape of the food container desired. The rectangular dough pieces 10 each have a predetermined length and width, dependent on the size of the food container to be formed and first and second generally parallel ends 52, 54, respectively.

Figure 4:
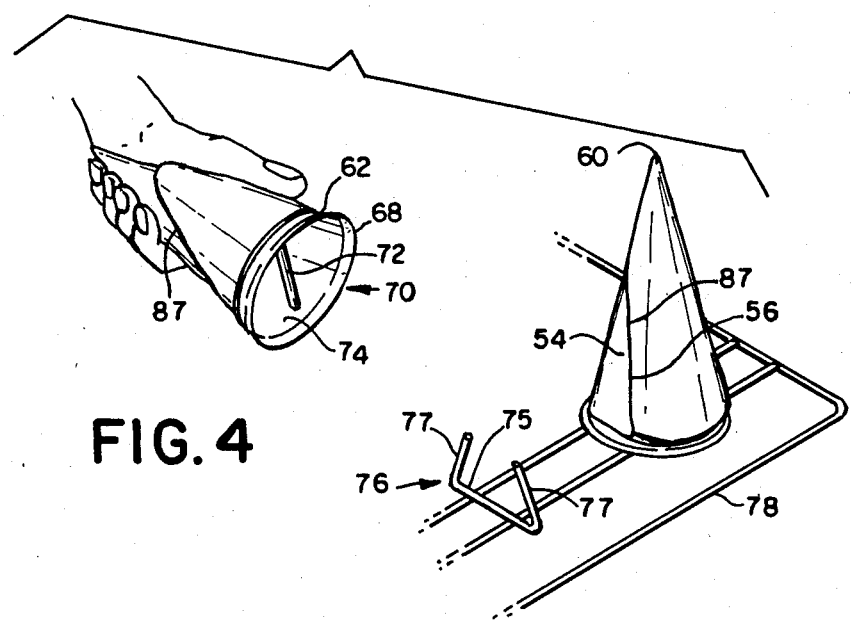
FIG. 4 is a perspective view of dough being shaped on a shaping mandrel in accordance with the present invention.

A plurality of shaping mandrels, only one of which 58 is shown, each having a shaping surface, are placed on the individual dough pieces which progress on the conveyor belt 22 from the circular cutter 38 and circular cleaver 48. Each shaping mandrel 58 is rolled to wrap a dough piece 10 in such a manner that the first dough end 52 engages the second dough end 54, as illustrated in FIGS. 2 and 4, to form a generally continuous covering of dough around the shaping mandrel 58. In the present embodiment, each shaping mandrel 58 is cone shaped and tapered and is formed from steel or some other non-heat-sensitive rigid material or the like. It will be apparent to those skilled in the art that other geometries and configurations of shaping surfaces or shaping mandrels can be utilized, depending on the shape of the edible food container desired. For example, cubic, pyramidal, frustoconical shaping surfaces can be utilized.

The cone shaped mandrel 58, as shown in FIGS. 2, 4, 8 and 9, has a first smaller closed apex end 60 and a second larger open opposite end 62. The second end 62 of the mandrel 58 has an outwardly flanged or cutting edge 68 for cutting or trimming any excess dough which extends beyond the end 62 of the mandrel surface as a result of the shaping process. In the preferred embodiment, trimming is accomplished by rotating the shaping mandrel 58 in a manner so that the flange or cutting edge 68 cuts or trims the excess dough which extends beyond the second opposite end 62. The cutting of the excess dough occurs when the mandrel 58 is rolled along the conveyor belt 22 to pick up and wrap the dough pieces.

The second end 62 of the mandrel 58 also includes engagement means 70 to assist and facilitate removal of the completed edible food container from the mandrel 58. In the preferred embodiment, the engagement means 70 comprises a generally cylindrical rod 72, shown schematically in FIGS. 4, 8 and 9, transversely aligned with and extending inwardly from the interior surface 74 of the mandrel 58. In the preferred embodiment, the rod 72 extends across the open end of the mandrel 58 along a diameter and is adapted for engaging stop means or stop elements 76 in a manner which will hereafter become apparent. It will be apparent to those skilled in the art that other geometries and configurations of engagement means (not shown) may be employed in conjunction with the present invention.

Figure 3:
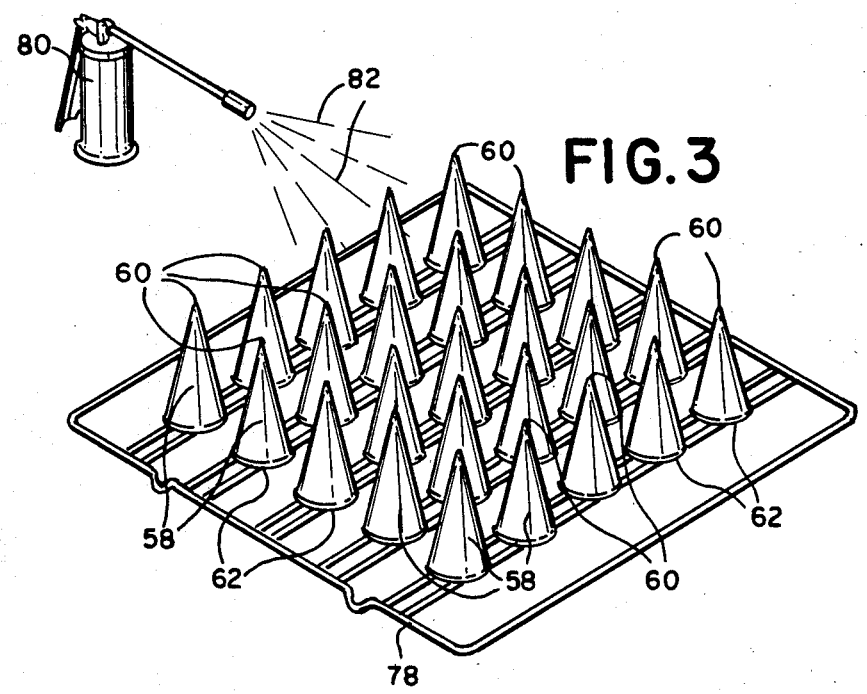
FIG. 3 is a perspective view of a spraying apparatus and mandrel receiving tray in accordance with the present invention.

As illustrated in FIG. 3, the shaping mandrels 58 are placed and held on a corrosion-resistant wire holding or receiving tray 78 prior to the shaping process. Each holding or receiving tray 78 is designed to carry a predetermined number of shaping mandrels 58 spaced apart from each other to avoid contact of dough between adjacent mandrels during baking and to facilitate easy placement on and removal from the tray 78 of the shaping mandrels 58. The tray 78 also has stop means or stop elements 76 which can engage the engagement means 70 of the mandrels 58. In the preferred embodiment, the stop element 76 comprises a rod 75 having two angled portions proximate each end which form two generally upwardly and outwardly extending prongs 77 angled generally towards each other. Furthermore, the prongs 77 are angled in a skewed fashion relative to each other.

Prior to the shaping process of wrapping the dough pieces 10 onto the shaping mandrels 58, each of the mandrels 58 greased by a spraying apparatus 80 of a type generally known in the art, as shown schematically in FIG. 3. In the preferred embodiment, the spraying apparatus 80 comprises a container with a pump and two or more spray nozzles (not shown). The spraying apparatus 80 is adjustable for varying the quantity and fineness of the spray. In the preferred embodiment, the shaping mandrels 58 are greased with oil, shortening or the like 82, which may be vegetable or nonvegetable oil, depending on the composition of the dough used in the present invention. It will be apparent to those skilled in the art that various other types of oils and shortening may be utilized in conjunction with the present invention. Upon the culmination of wrapping the dough pieces 10 on the greased mandrels 58, any of the previously cut or trimmed excess dough which extends beyond the ends of the shaping mandrels 58 is removed.

Figure 5:
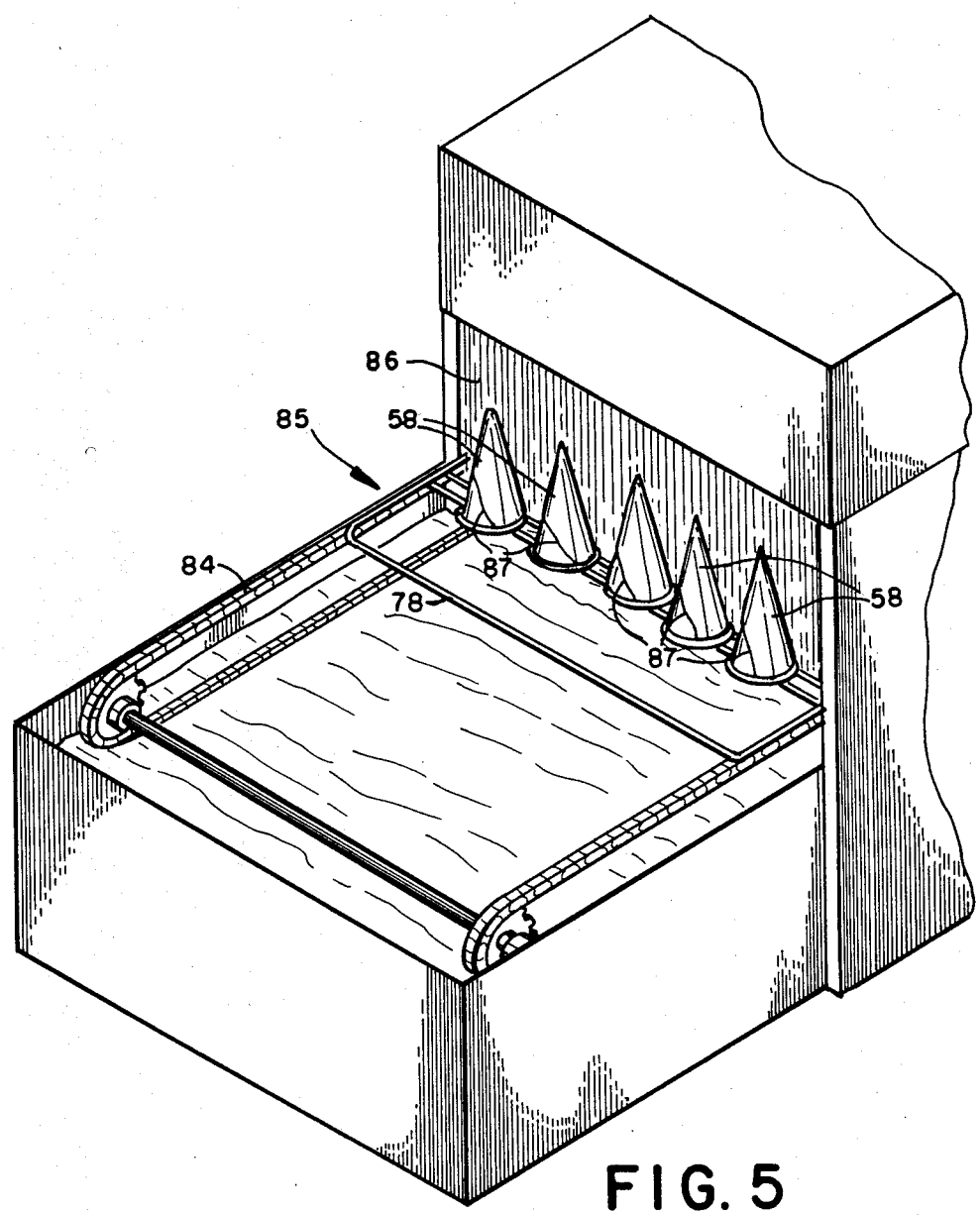
FIG. 5 is a perspective view of a caustic soda showering machine in accordance with the present invention.

The dough covered mandrels 58 are then placed and held on a corrosion-resistant wire tray 78. The loaded tray of dough covered mandrels 58 is then placed as shown in FIG. 5 on a second conveyor belt 84 of a type, also known in the art, for exposure to a shower of caustic soda 86. In the preferred embodiment, the shower of caustic soda 86, illustrated schematically in FIG. 5, is provided by an apparatus or machine 85 which comprises a caustic soda reservoir system and means for causing a waterfall of five percent (5%) solution caustic soda at a predetermined temperature to cascade on the tray 78 of the dough covered mandrels 58. The caustic soda reservoir system permits recycling of the solution for creating a uniform and continuous waterfall or bath of caustic soda. In operation, the conveyor belt 84 introduces the tray 78 of dough covered mandrels 58 to the caustic soda shower. The caustic soda 86 is applied to the dough in a uniform and continuous manner. The continued flow of the caustic soda 86 over the surface of the dough seals and smooths the seam 87 formed from wrapping and shaping the engaged dough ends 52, 54 on the mandrel 58.

Figure 6:
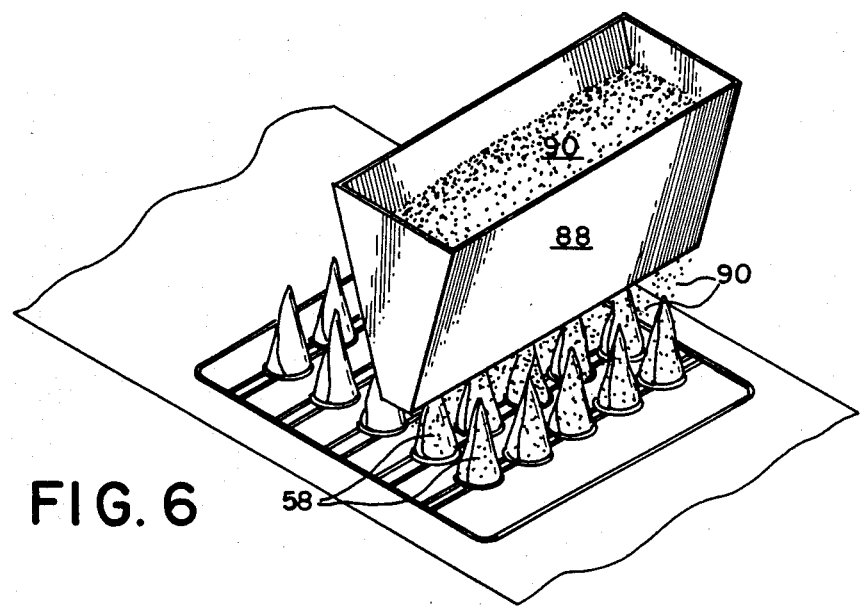
FIG. 6 is a perspective view of a salt strewing machine in accordance with the present invention.
Figure 7:
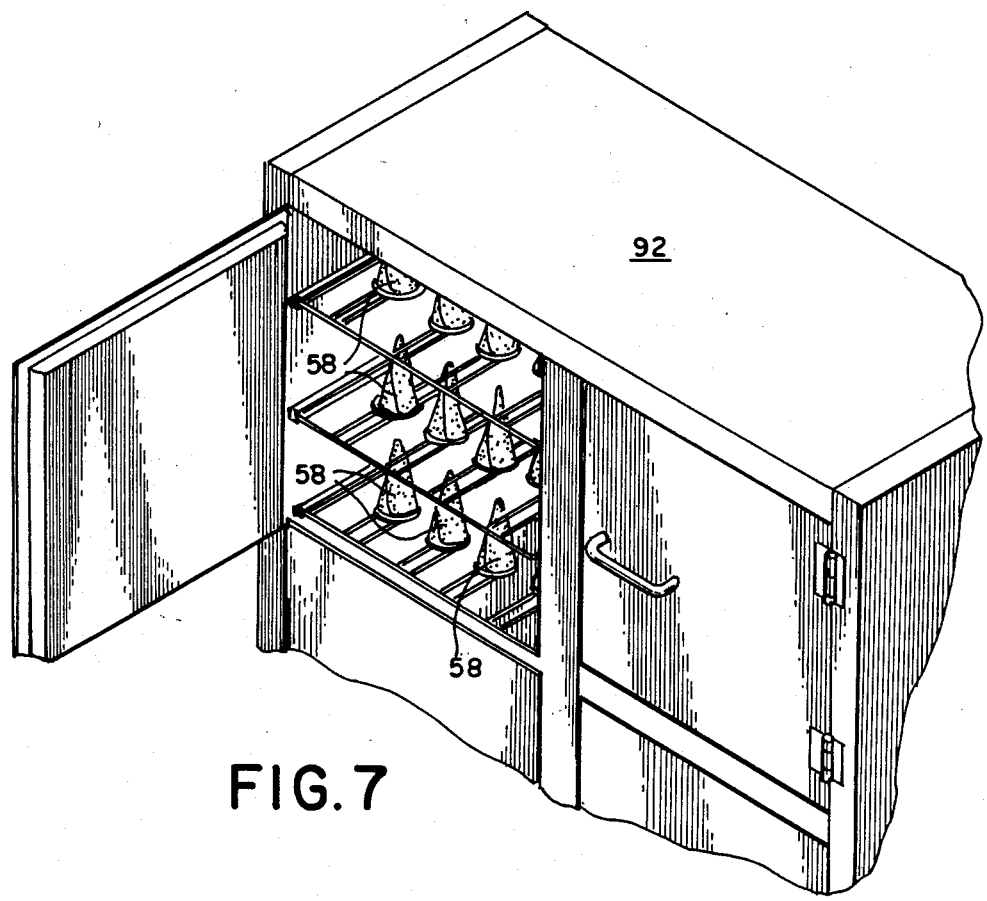
FIG. 7 is a perspective view of an oven in accordance with the present invention.
Figure 8:
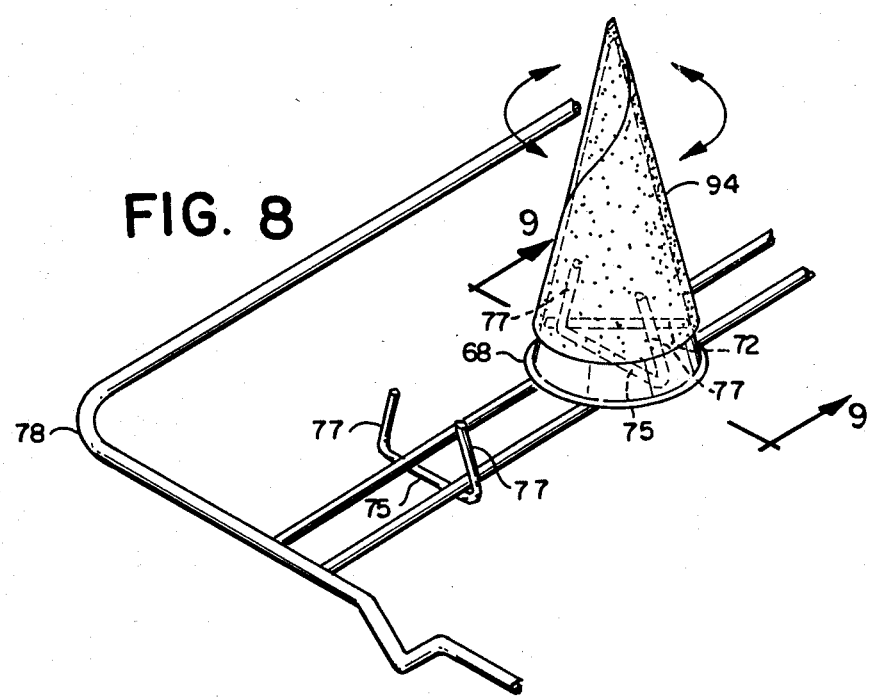
FIG. 8 is a perspective view, partially in phantom, of a shaping mandrel engaging a stop means of a receiving tray in accordance with the present invention.
Figure 9:
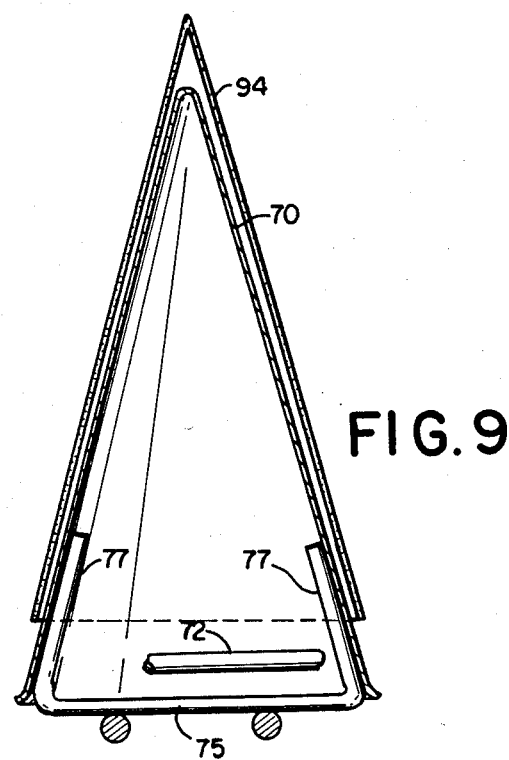
FIG. 9 is a sectional view of the shaping mandrel and a stop means taken along line 9—9 of FIG. 8.

Should a salted edible food container be desired, the conveyor belt 84 moves the tray of dough covered mandrels 58 to a salt strewer 88, shown schematically in FIG. 6, also of a type well known in the art. The salt strewer 88 dispenses salt in a continuous uniform manner or "curtain" onto the caustic-soda-soaked surface of the dough covered mandrels 58. The strewer 88 is adjustable for different size grains of salt 90. Also, the strewer 88 has a collection container (not shown) for gathering the strewed salt residue for possible reuse.

In the preferred embodiment, the salted, dough covered mandrel containing trays 78 are placed in a rack which, in turn, is placed in an oven 92. The dough covered mandrels 58 are baked in the oven 92 until the outer surfaces of the dough are at the desired pretzel color. Upon completion of the baking process, the rack with the tray of baked dough covered mandrels are removed from the oven and allowed to cool at room temperature.

After cooling, the baked dough edible food containers 94 are removed from the mandrel 58 by twisting each edible food container 94 with respect to its associated mandrel 58. The twisting process initially results in a turning of the mandrel 58 until the engagement means 70 of the mandrel 58 engages the stop means or stop elements 76 of the receiving wire tray 78 to firmly hold the mandrel 58 to prevent further rotation or upper movement of the mandrel 58. Once the mandrel 58 is engaged and held in a fixed position, continued twisting of the food container 94 results in the consistent, quick and easy release of the container 94 from the mandrel surface. The removed edible food container 94 formed from highly viscous dough 10 is immediately ready for consumption. In the preferred embodiment, the edible food container is cone shaped and formed from pretzel dough. The pretzel cone can be utilized as an ice cream container. The pretzel cone due to the pretzel dough composition can more readily support the weight of ice cream with less breakage than traditional ice cream cones. Furthermore, the texture of pretzel cones makes the cone relatively impermeable and less prone to leakage than traditional ice cream cones.

It will be recognized by those skilled in the art that changes may be made to the above-described embodiment of the present invention without departing from the broad inventive concepts thereof. It is understood, therefore, that this invention is not limited to the particular embodiment disclosed, but is intended to cover all modifications which are within the scope and spirit of the invention as defined by the appended claims.

I claim:

1. A method of forming an edible food container from viscous dough which comprises the steps of:
    (a) mixing ingredients to form the dough;
    (b) forming the dough in a generally continuous sheet;

(c) cutting the sheet of dough into generally parallelogram shaped pieces of a predetermined length and width having generally parallel sides and first and second generally parallel ends;

(d) wrapping each piece of dough around a shaping surface of a shaping mandrel having a first end and a second opposite end, so that the first and second ends of each piece of dough engage each other to form a generally continuous covering of dough around the shaping mandrel, thereby forming an edible food container;

(e) trimming away any excess of the shaped dough which extends beyond the ends of the shaping surface of the shaping mandrel;

(f) showering the dough on the mandrel with caustic soda solution;

(g) baking the dough on the mandrel;

(h) cooling the dough on the mandrel; and (i) twisting the baked dough with respect to the mandrel to remove the edible container from the mandrel.

2. A method according to claim 1, including the further step of strewing salt on the dough on the mandrel following showering step (f).

3. A method according to claim 1 wherein the viscous dough is pretzel dough.

4. A method according to claim 1 wherein the shaping mandrel is cone shaped for forming a cone shaped edible food container.

5. A method according to claim 1, including the further step of greasing the shaping mandrel before wrapping the pieces of dough around the shaping mandrel.

6. A method according to claim 5 wherein the shaping mandrel is greased with vegetable oil.

7. A method according to claim 5 wherein the shaping mandrel is greased with non-vegetable oil.

8. A method according to claim 1, including the further step of placing the dough-covered shaping mandrel on a receiving tray.

9. A method according to claim 8 in which the receiving tray includes a stop means for engaging and holding the dough-covered mandrel to facilitate twisting the baked dough with respect to the shaping mandrel for removal of the edible container.

* * * * *